(12) United States Patent
Lindoff et al.

(10) Patent No.: US 8,687,745 B2
(45) Date of Patent: Apr. 1, 2014

(54) METHOD AND APPARATUS FOR BLIND DECODING

(75) Inventors: Bengt Lindoff, Bjärred (SE); Matthias Kamuf, Lund (SE); Fredrik Nordström, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 904 days.

(21) Appl. No.: 12/134,243

(22) Filed: Jun. 6, 2008

(65) Prior Publication Data

US 2009/0154607 A1     Jun. 18, 2009

Related U.S. Application Data

(60) Provisional application No. 61/013,534, filed on Dec. 13, 2007, provisional application No. 61/013,816, filed on Dec. 14, 2007.

(51) Int. Cl.
*H03D 1/00*      (2006.01)
*H04L 27/06*     (2006.01)

(52) U.S. Cl.
USPC ........................................................ 375/341

(58) Field of Classification Search
USPC ......... 375/220, 259, 260, 267, 270, 316, 340, 375/341, 346, 347; 370/329, 349, 487, 529
See application file for complete search history.

(56) References Cited

U.S. PATENT DOCUMENTS

| | | |
|---|---|---|
| 5,671,255 A | 9/1997 | Wang et al. |
| 5,722,078 A | 2/1998 | Przelomiec et al. |
| 6,671,326 B1 | 12/2003 | Tortelier |
| 7,042,963 B1 * | 5/2006 | Raith et al. ............ 375/341 |
| 2002/0131532 A1 | 9/2002 | Chi et al. |

(Continued)

FOREIGN PATENT DOCUMENTS

| | | |
|---|---|---|
| EP | 1383290A1 | 1/2004 |
| EP | 1416661A2 | 5/2004 |

(Continued)

OTHER PUBLICATIONS

3GPP TSG-RAN WG1 Meeting #48bis. "Tree Structure for the DL Control Channel." R1-071683, Mar. 26-30, 2007.

(Continued)

*Primary Examiner* — Sam K Ahn
*Assistant Examiner* — Syed Haider
(74) *Attorney, Agent, or Firm* — Coats and Bennett, P.L.L.C.

(57) ABSTRACT

According to the teachings presented herein, a method and apparatus provide a reduced search space for blindly decoding a message included in a signal received at a communication receiver, where the message has an unknown format. Improving blind detection efficiency in this manner offers numerous advantages, including but not limited to lower power consumption through reduced processing overhead, and lower power consumption through expanded sleep opportunities. As a non-limiting example, the communication receiver comprises a mobile station configured for operation according to Long Term Evolution (LTE) standards, as promulgated by the 3GPP for E-UTRA systems, where the mobile station is configured to reduce a search space of DCI message decoding by determining message format likelihoods and blindly decoding a received DCI message based on the message format likelihoods.

27 Claims, 5 Drawing Sheets

(56) References Cited

U.S. PATENT DOCUMENTS

| | | | |
|---|---|---|---|
| 2004/0081260 A1* | 4/2004 | Matsusaka | 375/340 |
| 2005/0187995 A1* | 8/2005 | Smolyar et al. | 708/200 |
| 2006/0174179 A1 | 8/2006 | Visvanathan et al. | |
| 2006/0251191 A1 | 11/2006 | Willenegger | |
| 2007/0047499 A1* | 3/2007 | Montojo et al. | 370/335 |
| 2007/0177569 A1* | 8/2007 | Lundby | 370/349 |
| 2008/0056229 A1* | 3/2008 | Gholmieh et al. | 370/349 |
| 2009/0088148 A1* | 4/2009 | Chung et al. | 455/423 |
| 2009/0109915 A1* | 4/2009 | Pasad et al. | 370/329 |
| 2009/0168922 A1* | 7/2009 | Malladi et al. | 375/316 |

FOREIGN PATENT DOCUMENTS

| | | |
|---|---|---|
| EP | 1447943 | 8/2004 |
| EP | 1826939 | 8/2007 |
| GB | 2434066 | 1/2007 |
| WO | 2006/067720 | 6/2006 |
| WO | 2006/106377 | 10/2006 |
| WO | 2007/083081 | 7/2007 |
| WO | 2007/091101 | 8/2007 |
| WO | 2008/054313 | 5/2008 |

OTHER PUBLICATIONS

TSG-RAN WG1 #51. "DL Control Channel Structure: CCE Aggregation and Blind Detections." R1-074713, Nov. 5-9, 2007.

3GPP TSG RAN1#51bis. "Search Space Definition: Reduced PDCCH Blind Detection." R1-080079, Jan. 14-18, 2008.

3GPP TSG-RAN WG1 #51bis. "Reducing the Decoding Complexity of the PDCCH." R1-080303, Jan. 14-18, 2008.

3GPP TSG RAN WG1 #51bis. "Blind Detection Complexity Reduction with UE Specific PDCCH Scrambling." R1-080405, Jan. 14-18, 2008.

Bohge, M. et al. "Adaptive Coding as a Means to Increase Multi-User OFDM Control Channel Reliability." Telecommunication Networks Group, Berlin, Nov. 2007.

Reial, A. et al. "HS-PDSCH Blind Decoding." U.S. Appl. No. 60/946,872, filed Jun. 28, 2007.

Reial, A. et al. "HS-PDSCH Blind Decoding." U.S. Appl. No. 11/952,002, filed Dec. 6, 2007.

Andersson, L. et al. "HS-SCCH Decoding." U.S. Appl. No. 60/946,937, filed Jun. 28, 2007.

Andersson, L. et al. "Reliable Decoding of a High-Speed Shared Control Channel." U.S. Appl. No. 11/944,773, filed Nov. 26, 2007.

* cited by examiner

METHOD AND APPARATUS FOR BLIND DECODING

RELATED APPLICATIONS

This application claims priority under 35 U.S.C. §119(e) from the U.S. provisional patent application identified by App. No. 61/013,534, as filed on 13 Dec. 2007, and from the U.S. provisional patent application identified by App. No. 61/013,816, as filed on 14 Dec. 2007.

TECHNICAL FIELD

The present invention generally relates to signal processing, and particularly relates to blind decoding of messages in received signals.

BACKGROUND

The developing Evolved Universal Terrestrial Radio Access (E-UTRA) standards, as promulgated the Third Generation Partnership Project (3GPP), contemplate sending downlink control information (DCI) to targeted mobile stations according to varying message formats. As the amount and type of information conveyed in a given one of these downlink messages depends on the message content as particularized for the targeted mobile station, the message format (e.g., size, encoding, and/or sub-frame positioning) can vary from message to message. Example details for possible DCI message formats are given in Section 5.5.3 of 3GPP TS 36.212 V8.2.0 (2008-03).

That technical specification explains that each DCI message transports downlink or uplink scheduling information, or uplink power control commands for one Medium Access Control (MAC) ID. The MAC ID of the targeted mobile station is implicitly encoded in the Cyclic Redundancy Check (CRC) of each message. While this arrangement is advantageous from a signaling efficiency perspective, it imposes significant challenges at the mobile stations.

In particular, the mobile stations listening for DCI messages do not have a priori knowledge regarding the formatting details used to transmit a given DCI message, nor in general terms do they know in advance which mobile station is targeted by given DCI message. As such, an individual mobile station is obligated to blindly decode DCI messages to see whether a given received DCI message is targeted to it. However, because of the large number of format variations that can be used for sending DCI messages, the mobile station is obligated to test a large number of format assumptions before concluding that the DCI message is not targeted to it. That is, the mobile station faces the twofold challenge of not knowing whether the DCI message is targeted to it, and not knowing the formatting particulars of the decoding message. Thus, a decoding failure may arise from using the wrong formatting assumptions for the message, from too many decoding errors in the received codeword, or because the message is not targeted to the mobile station.

One approach to reducing the "search space" of DCI message decoding in the context of Long Term Evolution (LTE) air interface details is based on limiting the number of "control channel elements" (CCEs) from which DCI messages can be formed, and correspondingly limiting the "starting positions" that can be used for the different aggregation levels. Each CCE includes some number of resource elements (REs). In turn, each RE spans one sub-carrier in frequency and one OFDM symbol in time. Each CCE thus represents a basic resource unit for transmitting control information, and DCI messages of different sizes are accommodated by aggregating different numbers of CCEs. Thus, the number of CCEs aggregated to form a given DCI message represents one message formatting variable that is generally not known a priori to the mobile stations receiving the DCI message. Note, too, that for a given DCI format, the code rate of a DCI message is defined by the number of CCEs that are aggregated to form it.

Figure 1:
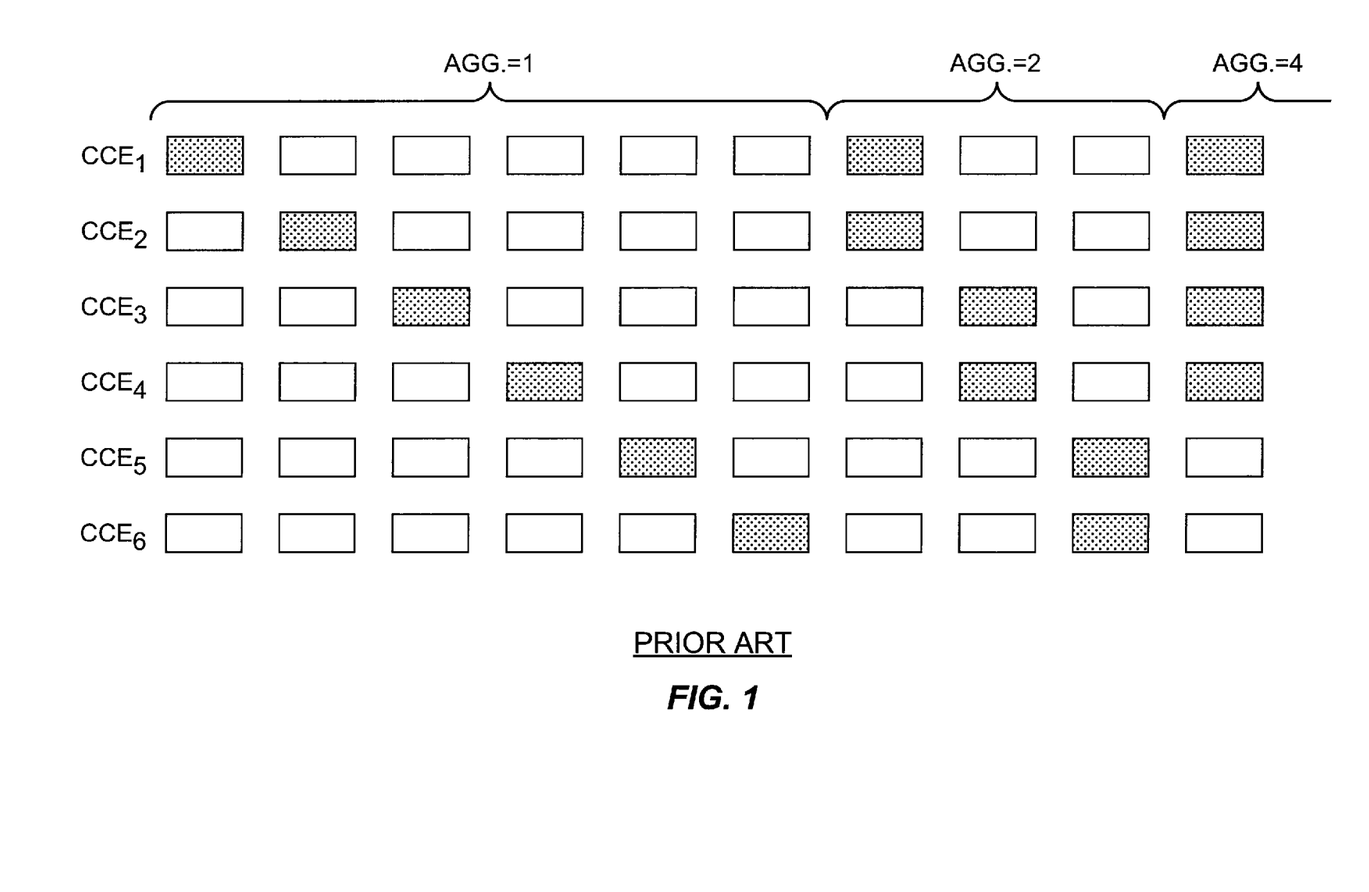
FIG. 1 is a diagram of selected possible control channel element (CCE) aggregations and positioning for sending DCI messages according to known conventions in an LTE-based communication system.

To limit the search hypotheses implicated by varying CCE aggregations, the number of DCI message format assumptions that must be considered by receiving mobile stations can be limited only to defined CCE aggregations, such as aggregations of 1, 2, 4, or 8 CCEs. FIG. 1 illustrates example aggregations for blocks of six CCEs (CCE1 . . . CCE6). For aggregations of one CCE, there are six possible CCE locations/patterns within the control channel region of a sub-frame, three CCE locations/patterns for CCE aggregations of two CCEs, and two locations/patterns for CCE aggregations of four CCEs. Accordingly, a given mobile station can limit its searching within the control channel region of a sub-frame to the patterns/locations possible for this limited set of CCE aggregations. Still, even with limiting the CCE aggregations that can be used, the universe of message format possibilities is quite large. The search burden can be computationally expensive, to the extent that mobile station battery life is compromised, or even to the extent that the mobile station literally does not have the processing speed necessary to cover the search space in the allowed time.

SUMMARY

According to the teachings presented herein, a method and apparatus provide a reduced search space for blindly decoding a message included in a signal received at a communication receiver, where the message has an unknown format. Improving blind detection efficiency in this manner offers numerous advantages, including but not limited to lower power consumption through reduced processing overhead, and lower power consumption through expanded sleep opportunities. As a non-limiting example, the communication receiver comprises a mobile station configured for operation according to Long Term Evolution (LTE) standards, as promulgated by the 3GPP for E-UTRA systems, where the mobile station is configured to reduce a search space of DCI message decoding by determining message format likelihoods and blindly decoding a received DCI message based on the message format likelihoods.

At least one embodiment provides, at a communication receiver, a method of blindly decoding a message included in a received signal according to an unknown one of a plurality of possible message formats. The method includes determining message format likelihoods for at least a subset of the possible message formats, and iteratively blindly decoding the message from the received signal, assuming a different message format in each iteration in an order based on the message format likelihoods. As an example, blind decoding iterations may be continued until the DCI message is successfully decoded, until the N most likely message formats have been tried, until a defined time has expired, etc. Advantageously, however, blind decoding may be configured to test message format assumptions in their determined order of likelihood.

In at least one such embodiment, determining message format likelihoods for at least a subset of the possible message formats comprises determining which message formats are more likely in a relative sense. That may be done, for example, as a function of at least one of received signal quality at the communication receiver, a communication service configuration of the communication receiver, and the message formats used to send one or more prior messages to the communication receiver.

In another embodiment, a communication receiver is configured to blindly decode a message included in a received signal according to an unknown one of a plurality of possible message formats. The communication receiver comprises one or more processing circuits configured to determine message format likelihoods for at least a subset of the possible message formats, and iteratively blindly decode the message from the received signal. The one or more processing circuits assume a different message format in each iteration in an order based on the message format likelihoods. For example, the processing circuit(s) may determine the message format likelihoods by generating a likelihood list that lists message formats in relative order of their likelihoods. Iterative decoding thus decodes the message using the most likely message format first and, if decoding is not successful, decodes again using the next most likely message format, and so on. Note that the receiver may receive more than one message targeted to it; thus, the receiver may need to look for other messages, e.g., of another DCI format, after successfully decoding a message.

However, the present invention is not limited to the above summary of features and advantages. Indeed, those skilled in the art will recognize additional features and advantages upon reading the following detailed description, and upon viewing the accompanying drawings.

DETAILED DESCRIPTION

Figure 2:
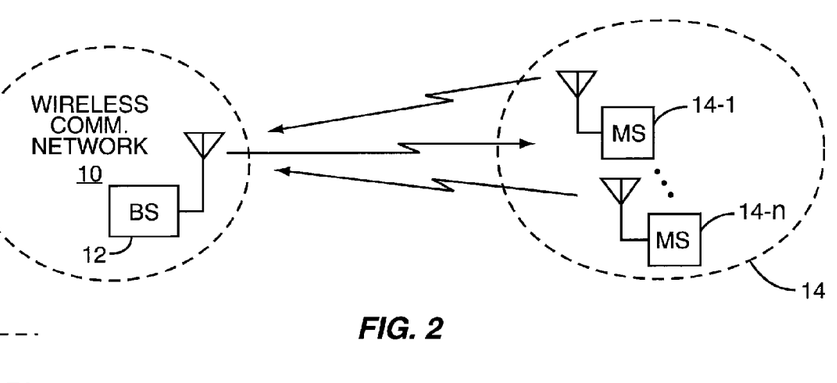
FIG. 2 is a block diagram of one embodiment of a wireless communication network, and one or more corresponding mobile stations.

FIG. 2 presents a simplified illustration of one embodiment of a wireless communication network 10, wherein a base station 12 transmits downlink signals to a plurality of mobile stations 14, e.g., mobile stations 14-1 through 14-n. Those skilled in the art will appreciate that the network 10 generally includes multiple base stations, individually or cooperatively supporting potentially many mobile stations, and also will appreciate that the actual number of mobile stations supported by the illustrated base station 12 may be a dynamically changing number. Further, in at least one embodiment, the network 10 is configured according to LTE/E-UTRA standards, as promulgated by the 3GPP, and the base station 12 (e.g., an enhanced NodeB) and the mobile stations 16 are likewise configured for LTE operation. However, the teachings presented herein have advantageous applicability beyond LTE-based implementations.

The methods and apparatus taught herein broadly provide for efficient blind decoding of messages included in received signals, where the message formats are unknown (in at least some regards) at the receivers. In one embodiment contemplated herein, one or more of the mobile stations 14 each include one or more processing circuits configured for efficient blind decoding as taught herein. However, those skilled in the art will recognize that these processing circuits can be implemented in other types of communication receivers (mobile or stationary) and will further recognize that the term "mobile station" is to be construed broadly. As used herein, the term includes but is not limited to cellular radiotelephones, pagers, PDAs, laptop/palmtop computers, network access cards, and essentially any other device that includes a communication receiver.

Figure 3:
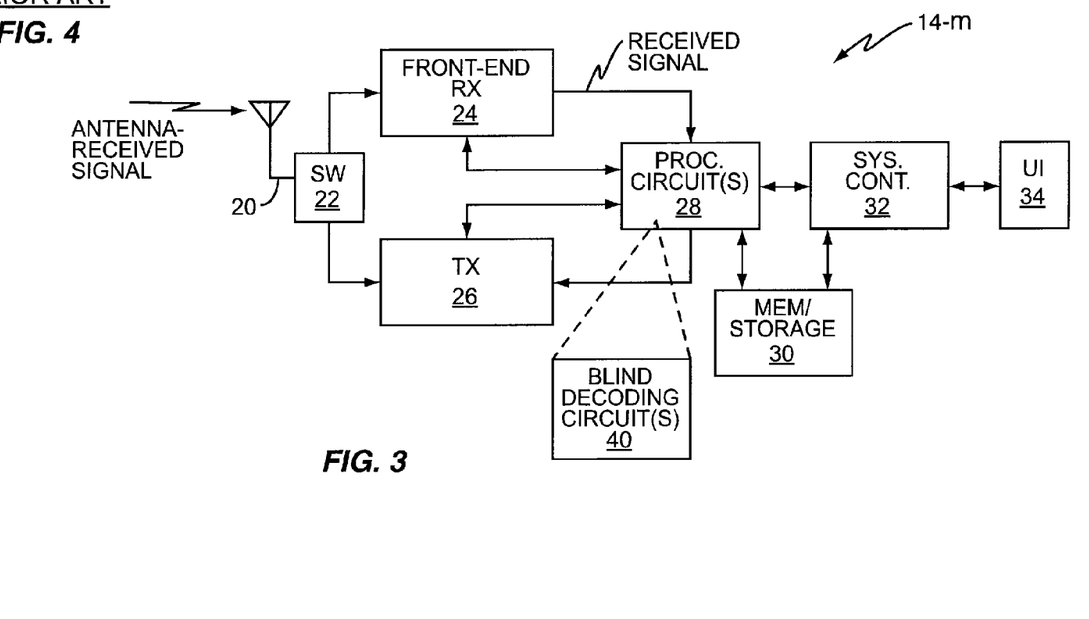
FIG. 3 is a block diagram of one embodiment of a mobile station that is configured to carry out blind decoding of received messages having unknown formatting.

With these possibilities in mind, FIG. 3 illustrates a non-limiting example of a mobile station 14-m that is configured to carry out one or more embodiments of efficient blind message decoding. The illustrated mobile station 14-m includes an antenna 20, a switch and/or duplexer 22, a receiver front-end 24, a transmit circuit 26, a processing circuit 28, memory/storage 30, a system controller 32, and, optionally, a user interface 34 (e.g., a keyboard, display, and audio transducers).

Figure 4:
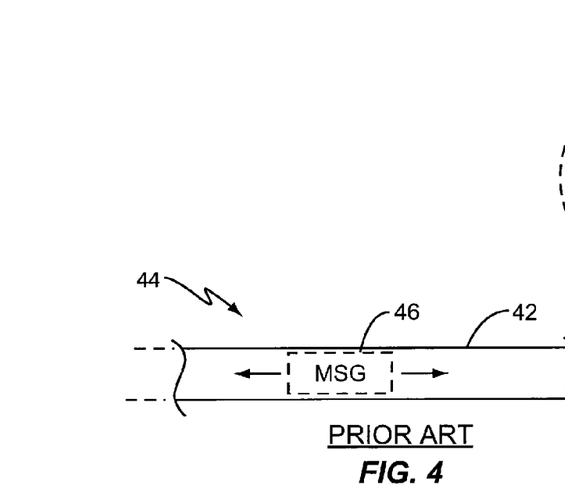
FIG. 4 is a diagram of variable message formatting (e.g., variable size and CCE positioning) as is known for sending downlink control messages in LTE, for example.

The receiver front-end 24 processes incoming antenna-received signals and provides corresponding digitized received signals to the processing circuit 28, such that these elements function as a communication receiver portion of the mobile station 14-m. Of particular interest, one sees that the processing circuit 28 includes one or more processing circuits 40 for blind decoding. The illustrated blind decoding circuits 40 are configured for efficient blind decoding of a received message of unknown formatting. As a non-limiting example, see FIG. 4, which illustrates that a frame or sub-frame 42 of a received signal 44 includes a message 46. As a non-limiting example, the signal 44 is a physical downlink control channel as defined for an LTE-based air interface, and the message 46 comprises at least one DCI message conveying downlink control information for a targeted mobile station. As such, the particular formatting used for transmitting any given DCI message depends on the contents of that message.

Returning to FIG. 3, the processing circuit 28 may comprise a baseband processor, e.g., one or more microprocessors, DSPs, ASICs, or other digital processing circuits. As such, the blind decoding circuit(s) 40 are implemented in hardware, software, or any combination thereof. In at least one embodiment, at least a portion of the blind decoding circuit(s) 40 is implemented by processing logic embodied in computer program instructions comprising a computer program or a portion thereof. The computer program instructions are, for example, stored in a computer readable media comprising or included in the memory/storage 30.

Figure 5:
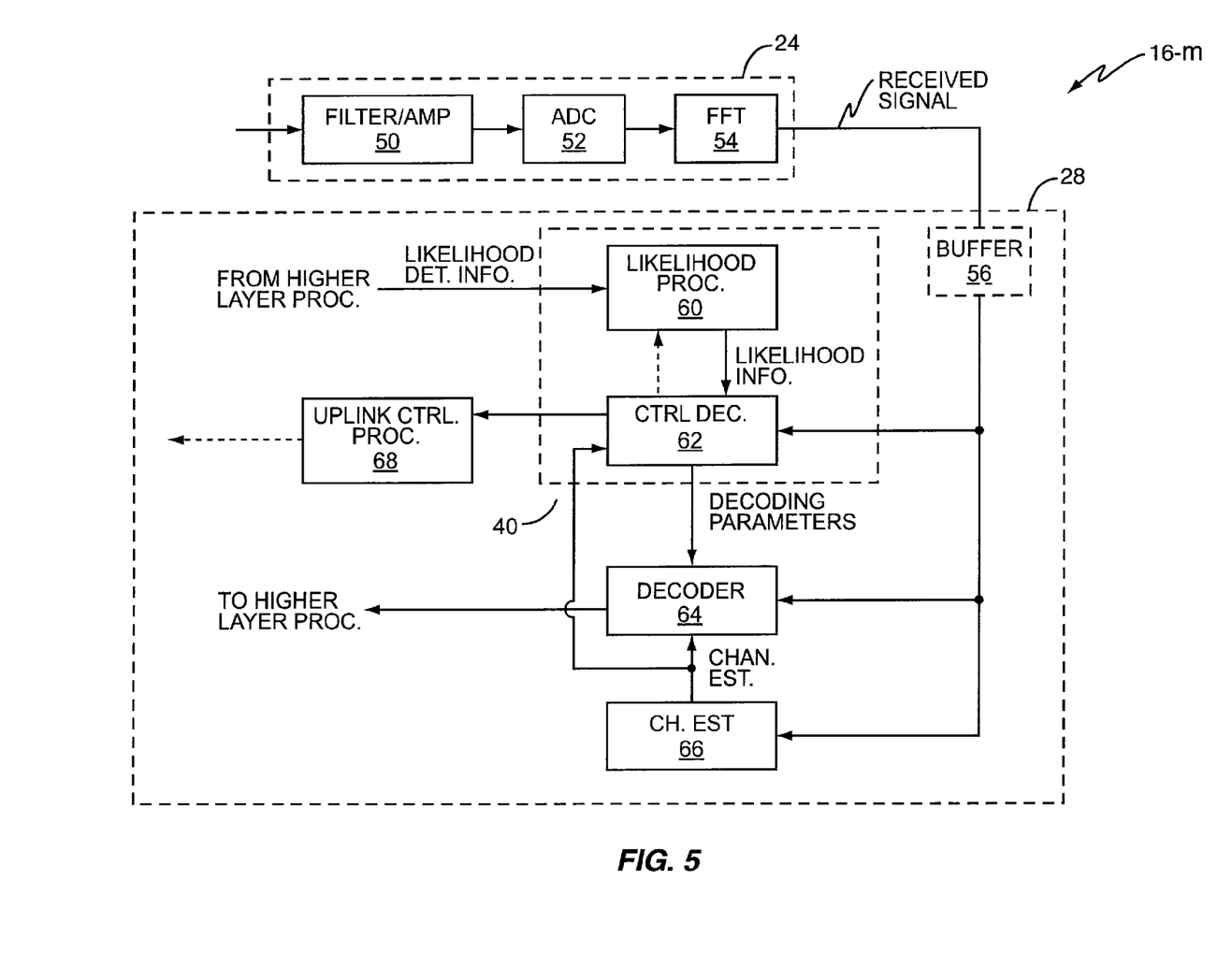
FIG. 5 is a block diagram of example receiver processing circuits for the mobile station of FIG. 3.

A more detailed but still non-limiting depiction of receiver-associated circuitry appears in FIG. 5. In this illustrated embodiment, the receiver front-end 24 includes filter/amplifier circuits 50, for initially processing an antenna-received signal, and an ADC circuit 52 for producing digital sample streams representing the antenna-received signal, along with a Fast Fourier Transform (FFT) circuit 54 for transforming the digital samples into the frequency domain—the FFT circuit would be omitted or replaced as needed, depending on the nature of the antenna-received signal and the desired processing domain.

The resultant received signal is provided to the processing circuit 28, which, in the illustrated embodiment, includes one or more signal buffers 56 for buffering all or portions of the received signal. The buffer(s) 56 are used, for example, for buffering frames or sub-frames of the received signal to be processed iteratively in accordance with blind message decoding as taught herein.

The processing circuit 28 further includes the blind decoding circuit(s) 40, here comprising a likelihood processor 60, and a control decoder 62. Further, this embodiment of the processing circuit 28 includes a (traffic data) decoder 64, a channel estimator 66, and one or more uplink control processors 68. Note that the processing circuit 28 and/or the system controller 32, as shown in FIG. 3, include additional processing elements or circuits, such as higher layer processors, for processing and responding to decoded data from the decoder 64 and decoded control information from the control decoder 62.

Among other things, the control decoder 62 decodes received control messages. For example, in an LTE embodiment, the control decoder 62 decodes DCI messages from buffered sub-frames of the received physical downlink control channel (PDCCH). As noted, those messages include downlink or uplink scheduling grant information, dynamic broadcast information, or power control information. Thus, in such embodiments, the successfully decoded output from the control decoder 62 may be passed along to one or more uplink control processors 68, and/or used to direct operation of the (data) decoder 64, which decodes traffic from downlink radio channels.

Whether configured according to the relevant LTE standards, the control decoder 62 generally does not know the format of a given message to be decoded. Moreover, the universe of possible message formats that could have been used in transmitting the message can be quite large. Still further, the control decoder 62 generally does not know whether the given message was or was not targeted to it. Assuming correction of any transceiving (transmission/reception errors) by the control decoder 62, the given message will successfully decode if the control decoder 62 decodes it using the correct format, and if the message is targeted to the control processor's mobile station (MAC ID).

To make such blind decoding more efficient, the likelihood processor 60 determines message format likelihoods, and the control decoder 62 iteratively decodes the (control) message included in the received signal, with each decoding iteration run assuming a different message format. More preferably, the likelihood processor 62 generates a likelihood list for at least some of the possible message formats.

Figure 7:
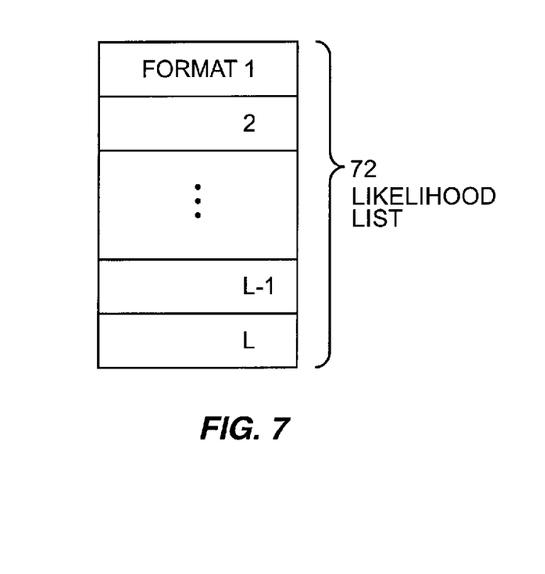

As an example description of such operation, assume that the mobile station 14-*m* receives a new sub-frame through its antenna 20, and processes it via receiver front-end circuit 24, such as by downconverting it to baseband, digitizing it and FFT processing it. The blind decoding circuits 40 start to decode the control channels in a received signal sub-frame according to the likelihood list 72 as generated by the likelihood processor 60. If the control decoder 62 detects control channel information based on its blind decoding, the mobile station 14-*m* responds accordingly. For example, the control channel information may be used to configure the decoder 64 for decoding at the time/space position, modulation and coding pointed out by the control information. In other instances, the control channel information comprises scheduling grant information and the mobile station 14-*m* responds accordingly. In this regard, the likelihood list 72 may be generated at least in part based on a priori knowledge about restrictions in the placement of DL/UL assignments.

More broadly, the likelihood list 72 may include at least the N most likely message formats, listed from most to least likely in a relative sense. Beyond some number of most likely formats, the list also may include other message formats taken from the universe of possible message formats, and these may be listed with or without any likelihood ordering.

Figure 6:
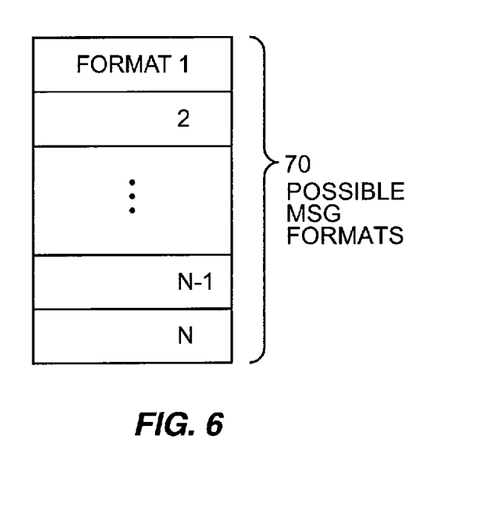
FIG. 6 is a diagram of an example set of all possible message formats, for a given type of message, while FIG. 7 correspondingly depicts one embodiment of a likelihood list that may be generated for at least a subset of such message formats, ordered according to their respective likelihoods of being used to transmit a given received message to be blindly decoded.

FIG. 6, for example, shows an example set 70 of all possible message formats, for a given communication message protocol. The value N represents the total number of possible message formats, which may be quite large for some types of variably formatted communication messages, e.g., DCI messages in LTE systems. Here, the word "format" as used herein in terms of "message format" should be understood quite broadly. For example, in at least one embodiment, "message format" may be understood as the combination of a DCI format, a CCE aggregation level, and a CCE starting position. Thus, the number and position of CCEs aggregated to form the DCI message, its payload size, etc., all are considered different formatting variations. Broadly, those skilled in the art will appreciate that variably formatted messages may change in their payload size, their coding rate, and in other aspects, all of which must be accounted for in correctly decoding a given received message whose formatting particulars are unknown at the receiver.

FIG. 7, however, illustrates that the efficiency of blind decoding may be improved through the use of a likelihood list 72, which lists the most likely message formats. In this manner, blind decoding by the control decoder 62 can iterate (as needed) through multiple decoding attempts that try the most likely message formats first. The 1 . . . L possible formats appearing in the likelihood list 72 are, in one embodiment, the L most likely message formats. The likelihood list 72 may list additional message formats; indeed, it may include the universe of possible message formats, such that all message formats can be tested, if necessary. However, in at least one embodiment, some number of first or top-most entries in the likelihood list 72 are the most likely message formats.

In this regard, the likelihood list 72 can be stored in the memory/storage 30, or elsewhere, and dynamically maintained as a function of changing conditions or configurations at the mobile station 14-*m*, or as directed by higher-layer signaling, for example. In particular, FIG. 5 illustrates that the processor 28 includes one or more higher-layer processors that are configured to provide likelihood determination information to the likelihood processor 60, such as information about the message formats used for previous control messages, prevailing (current) signal quality conditions, current service configurations (e.g., information about what types of communication services are currently active at the mobile station 14-*m*). The likelihood processor 60 uses any or all such information to determine which of the possible message formats are most likely to have been used for transmitting the currently received control messages(s) that are to be decoded, and provides corresponding likelihood information to the control decoder 62, such that it attempts decoding, at least initially, using the most likely message formats.

Figure 8:
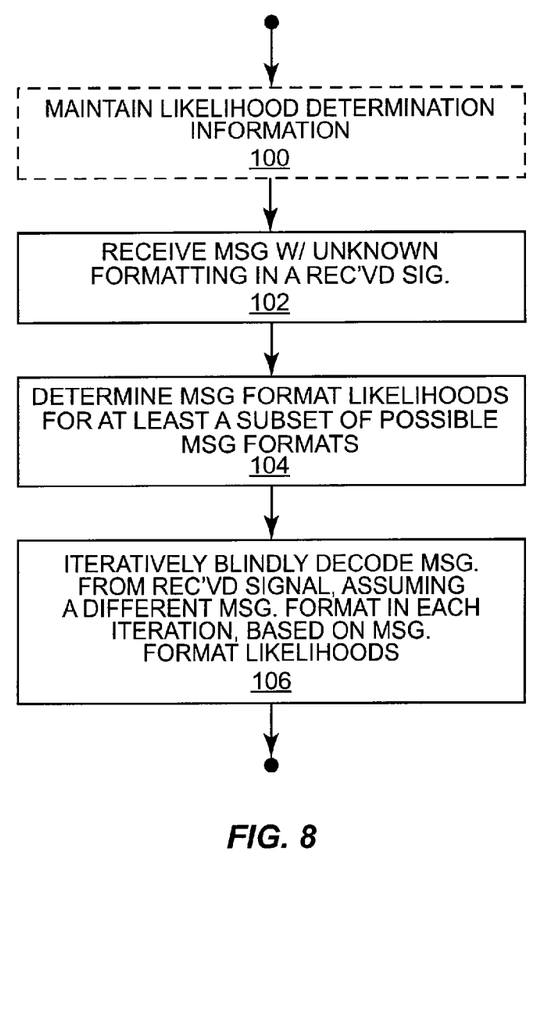
FIG. 8 is a logic flow diagram of processing logic implementing one embodiment of a method of blind decoding as taught herein.

Along these lines, FIG. 8 illustrates processing logic that may be implemented in the communication receiver of the mobile station 14-*m*. For example, the processing is implemented by configuring the receiver processing portion of the processor 28 through hardware and/or software. Those skilled in the art will appreciate that the contemplated method is not limited to the sequence illustrated in FIG. 8. Other sequences can be used. Also, at least some aspects of the illustrated processing may be done concurrently, and the illustrated processing also may represent a mix of background and foreground processing, not necessarily done at the same intervals. Also, it will be recognized that at least some of the illustrated processing can be looped or otherwise carried out as needed, and that any or all of the illustrated processing may be performed along with or as part of other processing operations.

With these qualifications in mind, the illustrated processing "begins" with maintaining likelihood determination information (Block 100). In at least one embodiment, this operation comprises at least one of maintaining some measure of received signal quality at the mobile station 14-$m$, maintaining an indication or other information regarding the communication service configuration of the mobile station 14-$m$, and maintaining knowledge regarding the message format(s) used in sending one or more prior messages to the mobile station 14-$m$.

Those skilled in the art will appreciate that the mobile station 14-$m$ maintains a measure of received signal quality for radio link adaptation, for example; thus, such information is readily available, and may be expressed as a signal-to-noise ratio (SNR), a signal-to-noise-plus-interference ratio (SINR), or as a quantized channel quality indicator (CQI), such as may be periodically reported by the mobile station 14-$m$.

As for information regarding the communication service configuration of the mobile station 14-$m$, such information comprises, in one or more embodiments, information identifying the communication service or service types that are active at the mobile station 14-$m$. Such information can be used to determine relative likelihoods of different message formats. For example, if the mobile station 14-$m$ is operating in an LTE system and is engaged in VoIP or another relatively low-rate data application, it likely is not operating in a spatial multiplexing configuration (multiple codeword configuration). Thus, message formats associated with control signaling for spatial multiplexing are unlikely, and may be omitted from the list of message formats to be tried in blind decoding, or at least moved toward the bottom of any message format likelihood listing. In any case, those skilled in the art will appreciate that the determination of the most likely message formats may change over one or more time intervals, or otherwise be updated as needed responsive to changing received signal quality, changing communication service configurations, etc.

The illustrated processing "continues" with receiving a signal that includes a message having an unknown one of a plurality of possible message formats (Block 102), and determining message format likelihoods for at least a subset of the possible message formats (Block 104). Note that message format likelihoods can be determined in advance of actually receiving the message, but, generally, the determination of which message formats are more likely than others reflects the conditions current for a given message or messages to be evaluated. In any case, processing continues with iteratively blindly decoding the message from the received signal (Block 106). Iterative blind decoding assumes a different message format in each iteration in an order based on the message format likelihoods. Again, in one or more embodiments, the term "message format" denotes the particular combination of a DCI format, a CCE aggregation level, and a CCE starting position used for a given message.

Figure 9:
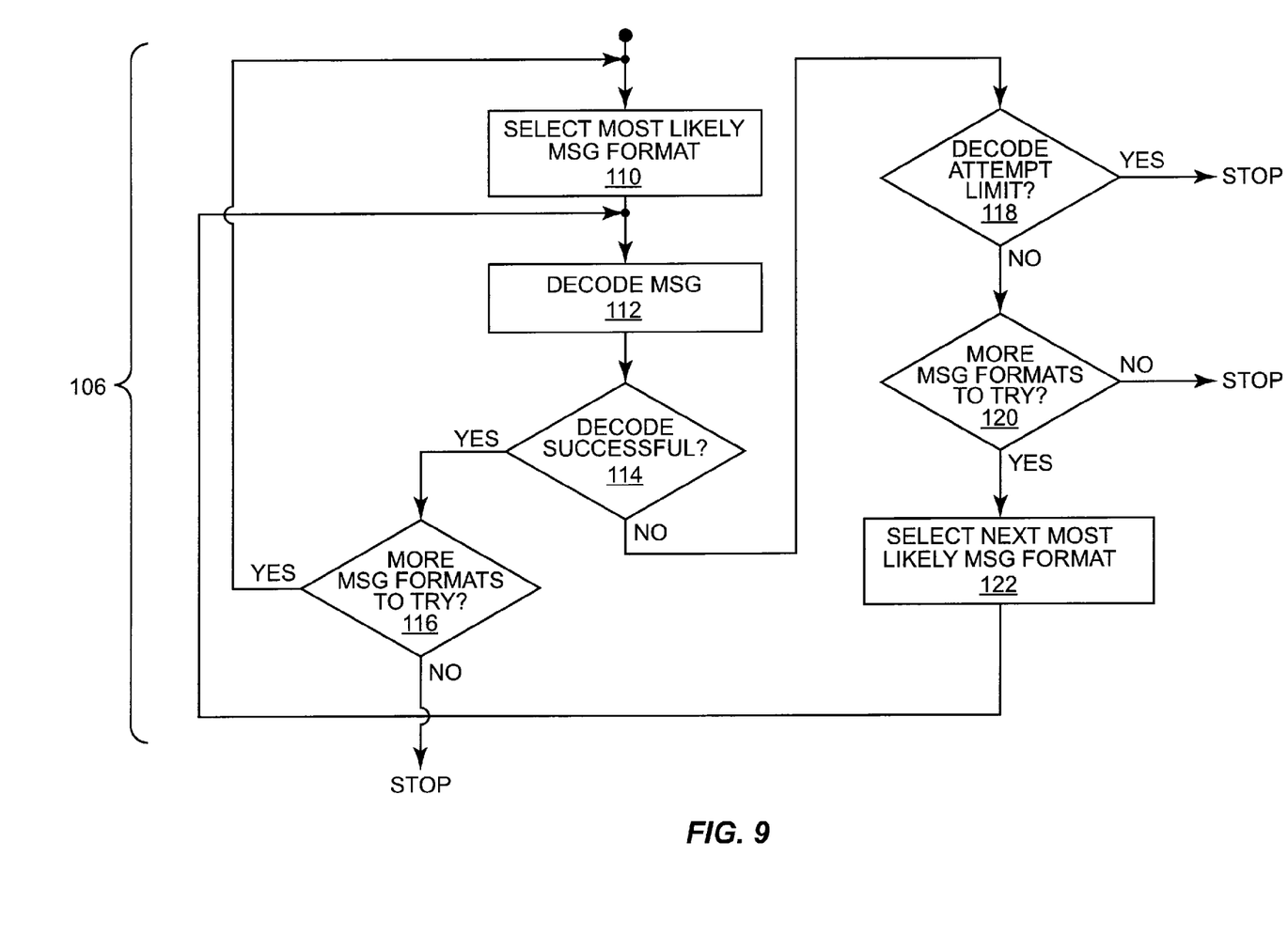
FIG. 9 is a logic flow diagram of processing logic implementing one embodiment of iterative blind decoding processing, such as used in the logic flow of FIG. 8.

FIG. 9 illustrates provides example details for the iterative blind decoding broadly encompassed by Block 106. Iterative processing begins with selecting the most likely message format (Block 110). Note that the likelihood list 72 of FIG. 7 can be ordered from most likely message format to least likely message format, such that the control decoder 62 begins its blind decoding iterations assuming the most likely message format.

The control decoder 62 decodes the message using the most likely message format (Block 112), and checks whether the decoding was successful (Block 114). Decoding is deemed successful, for example, if the message's CRC checks. If decoding was successful (Yes from Block 114), processing in one or more embodiments continues with further checking for additional messages. For example, if a DL assignment was found, there could also be an UL assignment targeted to the mobile station 14-$m$.

Thus, in response to successfully decoding a message of one format, the mobile station 14-$m$ may continue processing by attempting to decode one or more further messages from the same sub-frame. Processing thus may return to Block 110 after checking whether there are additional possible message formats left to try (Block 116). Note, however, that the formats considered most likely for this next message, or for succeeding messages decoding from the same sub-frame, may be revised based on the formats of any messages already successfully decoded from the sub-frame. Thus, in at least one embodiment, the mobile station 14-$m$ stops its message decoding attempts when all possible formats that could occur in the given sub-frame have been searched for. For example, if processing stops if N messages have been detected, where N may be a predetermined number representing the number of messages in one sub-frame that can be targeted to a given mobile station. Once iterative blind decoding stops, the successfully decoded message/messages is/are processed—e.g., the control information successfully decoded from one or more targeted DCI messages is acted on/responded to.

For example, the mobile station 14-$m$ (or other communication receiver) is in one or more embodiments configured to implement a method wherein, in response to successfully decoding a first message from a received signal, it attempts to blindly decode one or more additional messages from the received signal according to the message format likelihoods. Note that it may adjust the message format likelihoods (used for these additional blind decoding attempts) in view of the message formats of any messages already successfully decoded from the received signal for a same received signal time. The same "received signal time" connotes, for example, the same sub-frame of the received signal.

Turning back to the diagram, if decoding was not successful from Block 114, the likelihood processor 60, control decoder 62, or other functional element in the communication receiver checks whether a decoding attempt limit has been reached (Block 118). As non-limiting examples, the limit may be based on an iteration count limit and/or a blind decoding time limit. Blind decoding stops if the attempt limit is reached, and continues otherwise.

If processing continues, it is determined if there are more possible message formats to try (Block 120). If not, blind decoding stops at this point and it may be assumed, for example, that no messages in the current sub-frame were targeted to the mobile station 14-$m$. However, if there are more message formats to try, the next most likely message format is selected (Block 122), and processing is returned to the operations beginning at Block 112. Where the likelihood list 72 is ordered from most likely to least likely, selecting the next most likely message format is as simple as indexing to the next message format in the likelihood list. However, it should be noted that where one or more messages have been successfully decoded but processing continues looking for additional messages in the same sub-frame, the likelihood list 72 can be reordered, one or more formats can be removed from consideration, or other adjustments can be made in view of the format of the already-decoded message(s).

There are a number of advantageous ways contemplated herein, for determining message format likelihoods, and these determinations provide a basis for generating the contemplated likelihood list 72. As a first proposition, in at least one embodiment, determining message format likelihoods for at least a subset of the possible message formats comprises determining which message formats are more likely in a relative sense. Thus, it is not necessary, for example, to compute a numerical likelihood. Rather, the blind decoding circuits 40 need only determine in some relative sense which of the possible message formats are more likely than the others to have been used for a given received message. As such, the term "message format likelihood" as used herein should not be construed as necessarily indicating an actual calculated likelihood value. Indeed, in at least one embodiment, the term simply denotes a logical relation between possible message formats, based on a prediction or other determination by the blind decoding circuits 40 as to which message formats are more likely than others at a given time for a given received message.

As noted, the blind decoding circuits 40 may determine which message formats are more likely in a relative sense as a function of received signal quality at the communication receiver. Additionally, or alternatively, they may determine which message formats are more likely in a relative sense as a function of a communication service configuration of the communication receiver. Additionally, or alternatively, they may determine which message formats are more likely in a relative sense as a function of knowledge at the communication receiver about which particular message formats were used in sending one or more prior messages to the communication receiver. Thus, in at least one embodiment, determining message format likelihoods for at least a subset of the possible message formats comprises, for at least the subset of the possible message formats, determining which message formats are more likely as a function of at least one of a received signal quality at the communication receiver, a communication service configuration of the communication receiver, and knowledge at the communication receiver about which particular message format was used to send a prior message to the communication receiver.

In at least one such embodiment, determining which message formats are more likely comprises determining that lower coding rate message formats are more likely than higher coding rate message formats if received signal quality at the communication receiver is low and determining that higher coding rate message formats are more likely than lower coding rate message formats if received signal quality at the communication receiver is high. Here, lower coding rates use, for example, higher CCE aggregations such that messages are transmitted with more redundancy and thus have lower data rates, and higher coding rates use less redundancy, e.g., lower CCE aggregations, and thus have higher data rates.

In the same or another embodiment, determining which message formats are more likely comprises identifying which ones of the possible message formats are characteristically associated with the communication service configuration of the communication receiver. Here, for example, the blind decoding circuits 40 or other processing logic of the mobile station 14-$m$ considers which message formats are most likely to be used, given the nature of the communication services/applications currently being supported at the mobile station 14-$m$. As was noted earlier, VoIP and other lower rate services generally are not associated with higher-rate spatial multiplexing transmit/receive configurations; thus message formats associated with spatial multiplexing operation can be considered as unlikely for such service scenarios.

Regardless, in one or more embodiments, determining message format likelihoods for at least a subset of the possible message formats comprises generating a likelihood list that orders message formats according to their relative likelihoods. Correspondingly, iteratively blindly decoding the message from the received signal, assuming a different message format in each iteration in an order based on the message format likelihoods, comprises iteratively blindly decoding the message using a different message format in each of one or more iterations, according to likelihood list order. Particularly, iteratively blindly decoding the message comprises iteratively blindly decoding the message using different message format assumptions taken in order of likelihood until the message is successfully decoded, or until a determination is made to end blind decoding attempts. The communication receiver may end blind decoding attempts upon reaching a defined limit on the blind decoding attempts, wherein the defined limit is defined based on at least one of a numerical limit on the number of iterations, a numerical limit defined by the number of message formats for which likelihoods are determined, and a time limit defined by processing or signal timing requirements imposed on the communication receiver. Further, in at least one embodiment, the communication receiver is configured to end blind decoding attempts when all possible DCI formats that could have appeared have been successfully decoded.

As noted, the received signal is, in one or more embodiments, a control channel signal and the message comprises downlink control information (DCI) targeted to one in a plurality of communication receivers, including the communication receiver associated with the blind decoding circuits 40 described herein. In such contexts, and with particular regard to E-UTRA/LTE implementations, the teachings herein do not restrict the freedom of CCE-positioning for use in DCI messaging within in a control channel sub-frame.

Broadly, the teachings herein propose to establish a list of control channel message format candidates that are searched in decreasing order of likelihood. Information such as current CQI/SNR, information about current services, and information about size and position of earlier received control messages can be used for determining the likelihood list. These teachings readily apply in cases where the search space has already been reduced by some amount, such as where mobile-station specific indices indicate certain CCE regions for DCI messages, and/or where the allowed CCE aggregations are restricted (e.g., to 1/2/4/8). Such information can be configured in the mobile station 14-$m$, or signaled to it on a broadcast channel, for example.

Building the likelihood list 72 can be based on considering the current SNR at the mobile station 14-$m$ and/or based on knowledge of the knowledge of the previous control channel message formats used to send control messages to the mobile station 14-$m$. A measure of the SNR is readily available either from the receiver front-end's automatic gain control (AGC) circuitry—see RX front-end 24 in FIG. 4 or 5—or it can be derived from the mobile station's previously transmitted CQI report. Given that the mobile station 14-$m$ is experiencing good SNR, the coding rate of the control channel does not have to be too low to guarantee a required DCI decoding error rate. Thus, it is advantageous to start looking for control channel candidates that stem from aggregations of 1 (or 2) CCEs before searching for the more unlikely aggregations of 4 or 8 CCEs. Doing so reduces the average number of searches needed for blind decoding of received DCI messages, thus making more processing/time resources available for real or near real-time traffic decoding and other signal processing functions.

In at least some implementations, during conditions of good SNR at the mobile station 14-$m$, blind decoding attempts for a DCI message received in a PDCCH sub-frame are stopped after searching through the possible one and two CCE aggregation positions. This stoppage is appropriate because it is unlikely that a low coding rate (e.g., four or eight CCE aggregations) will be used to send DCI messages to the mobile station 14-$m$ during times when it enjoys good SNR. Thus, after having performed an abbreviated search through message format possibilities for one and two CCE aggregations without successfully decoding a DCI message, the mobile station 14-$m$ can go to sleep until the next PDCCH sub-frame, thereby decreasing power consumption and improving battery life. For other scenarios and services, the mobile station 14-$m$ may continue decoding the more unlikely cases to cover, for example, all or a larger portion of the possible message formats.

Similarly, if the mobile station 14-$m$ is operating in low signal quality conditions (low SNR), it advantageous to begin blind decoding assuming the lower coding rate message formats which use the higher CCE aggregations of eight or four. The mobile station 14-$m$ may quantize signal quality into low/moderate/high regions, for example. The actual SNR measures, in dB for example, that map into these low/moderate/high regions will depend on the particular communication standards and receiver specifications involved. In any case, the blind decoding circuits 40 can be configured, for example, to begin blind decoding of a received DCI message assuming a CCE aggregation of eight if SNR/CQI is "low". It may then attempt decoding assuming CCE aggregations of four, and so on, if blind decoding at the higher aggregation is unsuccessful. Likewise, it may begin blind decoding assuming CCE aggregations of four or lower for moderate signal quality conditions, and begin decoding assuming CCE aggregations of two or lower during good signal quality conditions.

As noted, the mobile station 14-$m$ may be configured to search through a reduced number of the most likely ones of the possible message formats, rather than through them all. For DCI messages on the LTE downlink, the mobile station 14-$m$ gains additional "micro-sleep" time in this manner, to the extent that it can test all of at least the most likely message format hypotheses before approximately the end of the first slot of the PDCCH sub-frame.

Additionally, or alternatively, the mobile station 14-$m$ may make message format likelihood determinations based on its knowledge about the control channel allocations in the previous sub-frame/sub-frames. That is, it may be advantageous for the mobile station 14-$m$ to assume that a currently received DCI message is formatted (coding, positioning, etc.) like or similar to one or more previously received DCI messages that were targeted to the mobile station 14-$m$. In some scenarios, control message targeted to a particular mobile station 14-$m$ are placed at approximately the same sub-frame position over consecutive sub-frames and that knowledge can be utilized for reducing the number of blind decoding attempts.

The mobile station 14-$m$ also may advantageously apply similar logic in terms of recognizing that its current service configurations provide insight into which message formats are more likely. For example, VoIP services in the LTE context require very few resource blocks, and hence, once the service is started, the DL/UL resource allocations/grants likely do not change significantly between sub-frames. Hence, a mobile station 14-$m$ engaged in VoIP service can advantageously reduce the search space of blind decoding of DCI messages by considering that the DCI message sizes and positions of prior targeted DCI messages as being most likely for a next-received DCI message. Such processing may require that the transmitting base station prioritizes the positioning of already-scheduled mobile stations.

Further, at least some embodiments of the blind decoding circuits 40 configure the control decoder 62 as a joint or parallel decoder. In such embodiments, the most likely message sizes and positions can be tested jointly, further accelerating the blind decoding process. The teachings herein also contemplate improving blind decoding efficiency by anticipating possible message coding rates in order to mitigate the multiplicity of possibilities that arise when message format depends on multiple variables, including size, (sub-frame) position, and coding rate. For example, in a low-SNR operating scenario for the mobile station 14-$m$, it is less likely that spatial multiplexing is used in the current transmission, and thus the blind decoding circuits 40 can start by looking for message sizes associated with non-spatial multiplexing scheduling assignments. Likewise, for good SNR conditions, the blind decoding circuits 40 can advantageously begin blind decoding operations searching for message formats characteristically associated with spatial-multiplexing control signaling (at least where the transmitting base station is equipped with more than one transmit antenna).

In one particular aspect of improving blind decoding efficiency in the context of LTE-based DCI messages, those skilled in the art will appreciate that the control message code rate is implicitly determined by the size of the trellis K. This size is a function of resource assignments, and the size of the resource assignment is a function of the desired bandwidth. This code rate in turn determines the mapping of soft values in the received signal along the trellis branches. Assume a given bandwidth and duplex mode, there are two or more (e.g., four) possible trellis sizes K to use for blind decoding, as the DCI message may include either an UL scheduling grant, or a DL scheduling grant for spatial multiplexing and non-spatial multiplexing modes. This fact means that the number of decoding required to test one or more other format assumptions is multiplied by the number of possible trellis sizes K. Given this, the potential size of the search space needed for blind DCI message decoding in LTE can be prohibitive.

Of course, the teachings herein have broader applicability and further advantages. As such, the present invention is not limited to the foregoing discussion and accompanying drawings. Instead, the present invention is limited only by the following claims and their legal equivalents.

What is claimed is:

1. At a communication receiver, a method of blindly decoding a message included in a received signal according to an unknown one of a plurality of possible message formats, the message being accommodated by a control channel element (CCE) aggregation comprising an unknown number of control channel elements (CCEs) and a CCE starting position:

determining message format likelihoods for at least a subset of the possible message formats by determining which message formats are more likely in a relative sense as a function of received signal quality at the communication receiver and message formats used in prior messages received by the communication receiver;

ordering the possible message formats in the subset according to the determined message format likelihoods;

iteratively blindly decoding the message from the received signal, assuming a different message format in each iteration in the order based on the message format likelihoods; wherein the blindly decoding of the message is restricted to CCE aggregations comprising a number of CCEs fewer than a pre-defined number; and in response to successfully decoding the message, adjusting the message format likelihoods for one or more additional messages in the received signal based on the message formats of any messages already successfully decoded from the received signal for a same received signal time.

2. The method of claim 1 wherein determining which message formats are more likely in a relative sense as a function of received signal quality at the communication receiver comprises determining which message formats are more likely in a relative sense as a function of at least one of a signal-to-noise ratio, a signal-to-noise-plus-interference ratio, and a channel quality indicator.

3. The method of claim 1 wherein determining which message formats are more likely in a relative sense comprises determining which message formats are more likely in a relative sense as a further function of a communication service configuration of the communication receiver.

4. The method of claim 1 wherein determining which message formats are more likely in a relative sense comprises determining which message formats are more likely in a relative sense as a further function of knowledge at the communication receiver about which particular message formats were used in sending one or more prior messages to the communication receiver.

5. The method of claim 1, further comprising determining which message formats are more likely as a function of a communication service configuration of the communication receiver, and knowledge at the communication receiver about which particular message format was used to send a prior message to the communication receiver.

6. The method of claim 1, wherein determining which message formats are more likely in a relative sense as a function of received signal quality comprises determining that higher coding rate message formats are more likely than lower coding rate message formats if received signal quality at the communication receiver is high, and determining that lower coding rate message formats are more likely than higher coding rate message formats if received signal quality at the communication receiver is low.

7. The method of claim 5, wherein determining which message formats are more likely comprises identifying which ones of the possible message formats are characteristically associated with the communication service configuration of the communication receiver.

8. The method of claim 1, wherein determining message format likelihoods for at least a subset of the possible message formats comprises generating a likelihood list that orders message formats according to their relative likelihoods, and wherein iteratively blindly decoding the message from the received signal, assuming a different message format in each iteration in an order based on the message format likelihoods, comprises iteratively blindly decoding the message using a different message format in each of one or more iterations, according to likelihood list order.

9. The method of claim 1, wherein the received signal is a control channel signal and the message comprises downlink control information (DCI) targeted to one in a plurality of communication receivers, including the communication receiver.

10. The method of claim 1, wherein iteratively blindly decoding the message from the received signal, assuming a different message format in each iteration in an order based on the message format likelihoods, comprises iteratively blindly decoding the message using different message format assumptions taken in order of likelihood until the message is successfully decoded, or until a determination is made to end blind decoding attempts.

11. The method of claim 10, further comprising determining to end blind decoding attempts upon reaching a defined limit on the blind decoding attempts, wherein the defined limit is defined based on at least one of a numerical limit on the number of iterations, a numerical limit defined by the number of message formats for which likelihoods are determined, and a time limit defined by processing or signal timing requirements imposed on the communication receiver.

12. The method of claim 10, further comprising, in response to successfully decoding the message, attempting to blindly decode one or more additional messages from the received signal according to the message format likelihoods.

13. A communication receiver configured to blindly decode a message included in a received signal according to an unknown one of a plurality of possible message formats, said message being accommodated by a control channel element (CCE) aggregation comprising an unknown number of control channel elements (CCEs) and a CCE starting position, said communication receiver comprising one or more processing circuits configured to:

determine message format likelihoods for at least a subset of the possible message formats by determining which message formats are more likely in a relative sense as a function of received signal quality at the communication receiver and message formats used in prior messages sent to the communication receiver;

order the possible message formats in the subset according to the determined message format likelihoods;

iteratively blindly decode the message from the received signal, assuming a different message format in each iteration in the order based on the message format likelihoods, restrict CCE aggregations used for decoding the message to CCE aggregations comprising a pre-defined number of CCEs or fewer; and in response to successfully decoding the message, adjust the message format likelihoods for one or more additional messages in the received signal based on the message formats of any messages already successfully decoded from the received signal for a same received signal time.

14. The communication receiver of claim 13, wherein the one or more processing circuits are configured to determine which message formats are more likely in a relative sense as a function of received signal quality at the communication receiver by determining which message formats are more likely in a relative sense as a function of at least one of a signal-to-noise ratio, a signal-to-noise-plus-interference ratio, and a channel quality indicator.

15. The communication receiver of claim 13, wherein the one or more processing circuits are configured to determine which message formats are more likely in a relative sense as a further function of a communication service configuration of the communication receiver.

16. The communication receiver of claim 13, wherein the one or more processing circuits are configured to determine which message formats are more likely in a relative sense as a further function of knowledge at the communication receiver about which particular message formats were used in sending one or more prior messages to the communication receiver.

17. The communication receiver of claim 13, wherein the one or more processing circuits are further configured to determine the message format likelihoods by determining which message formats are more likely as a function of a communication service configuration of the communication receiver, and knowledge at the communication receiver about which particular message format was used to send a prior message to the communication receiver.

18. The communication receiver of claim 13, wherein the one or more processing circuits are configured to determine which message formats are more likely in a relative sense as a function of received signal quality by determining that lower coding rate message formats are more likely than higher coding rate message formats if received signal quality at the communication receiver is low and determining that higher coding rate message formats are more likely than lower coding rate message formats if received signal quality at the communication receiver is high.

19. The communication receiver of claim 17, wherein the one or more processing circuits are configured to determine which message formats are more likely by identifying which ones of the possible message formats are characteristically associated with the communication service configuration of the communication receiver.

20. The communication receiver of claim 13, wherein the one or more processing circuits are configured to determine the message format likelihoods by generating a likelihood list that orders message formats according to their relative likelihoods, and are configured to iteratively blindly decode the message from the received signal by iteratively decoding the message using a different message format assumption in each of one or more iterations, in likelihood list order.

21. The communication receiver of claim 13, wherein the received signal is a control channel signal and the message comprises downlink control information (DCI) targeted to one in a plurality of communication receivers, including the communication receiver.

22. The communication receiver of claim 13, wherein the one or more processing circuits are configured to iteratively blindly decode the message from the received signal by iteratively blindly decoding the message using different message format assumptions taken in order of likelihood until the message is successfully decoded, or until a determination is made to end blind decoding attempts.

23. The communication receiver of claim 22, wherein the one or more processing circuits are configured to end blind decoding attempts upon reaching a defined limit on the blind decoding attempts, wherein the defined limit is defined based on at least one of a numerical limit on the number of blind decoding iterations, a numerical limit defined by the number of message formats for which likelihoods are determined, and a time limit defined by processing or signal timing requirements imposed on the communication receiver.

24. The communication receiver of claim 22, wherein the one or more processing circuits are further configured to, in response to successfully decoding the message, attempt to blindly decode one or more additional messages from the received signal according to the message format likelihoods.

25. The communication receiver of claim 12, wherein the one or more processing circuits comprise a controller configured to determine a likelihood list representing the relative likelihoods for a number of message formats, and a decoder configured to iteratively blindly decode the message.

26. The method of claim 1 wherein the subset of the possible message formats comprises a limited number of possible message formats less than the plurality of possible message formats.

27. The communication receiver of claim 13 wherein the subset of the possible message formats comprises a limited number of possible message formats less than the plurality of possible message formats.

* * * * *